United States Patent
Sueda

[11] 3,720,870
[45] March 13, 1973

[54] APPARATUS FOR DETERMINING THE PERMEABILITY OF A NON-MAGNETIC MEDIUM

[76] Inventor: Osamu Sueda, 340-2, Sakuro, Minoo-shi, Osaka, Japan

[22] Filed: July 19, 1971

[21] Appl. No.: 163,822

[52] U.S. Cl..........................324/34 R, 324/36, 73/23
[51] Int. Cl................................................B01r 33/12
[58] Field of Search..........324/36, 34 R; 73/23, 27 A

[56] References Cited

UNITED STATES PATENTS

| | | | |
|---|---|---|---|
| 2,467,211 | 4/1949 | Hornfeck | 324/36 |
| 2,689,332 | 9/1954 | Greene | 324/36 |
| 3,539,913 | 11/1970 | Prival | 324/36 |

Primary Examiner—Robert J. Corcoran
Attorney—W. G. Fasse

[57] ABSTRACT

A plurality of non-ferromagnetic bodies having a poor conductivity and different magnetic permeabilities are positioned in a gap formed in a magnetic circuit biased by a DC magnetic flux. The bodies are displaced relatively within the gap to cause a change of the flux, thereby providing alternate outputs in the coil.

These alternate outputs are proportional to the difference between the magnetic permeabilities of these bodies. If one body is a sample of known permeability and the other body is sample of unknown permeability to be measured, the unknown permeability of the sample to be measured may be determined instantaneously by suitably processing or evaluating the alternate output or outputs.

12 Claims, 5 Drawing Figures

INVENTOR

OSAMU SUEDA

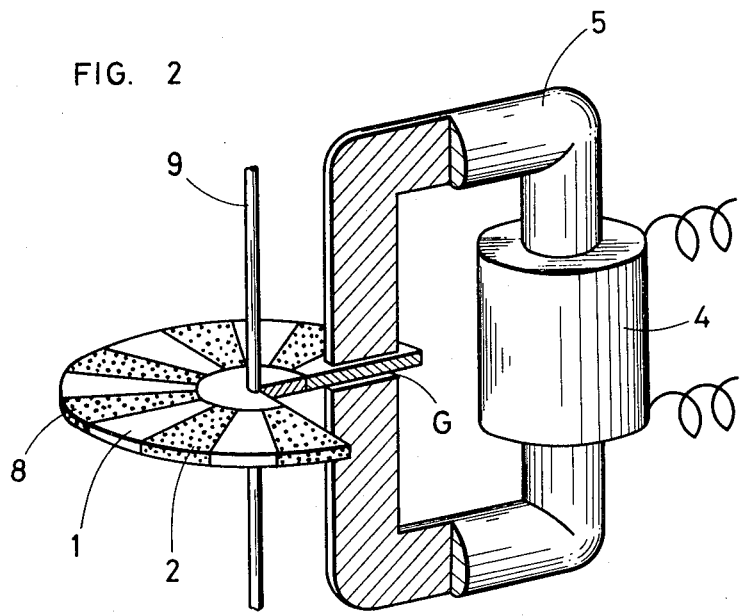
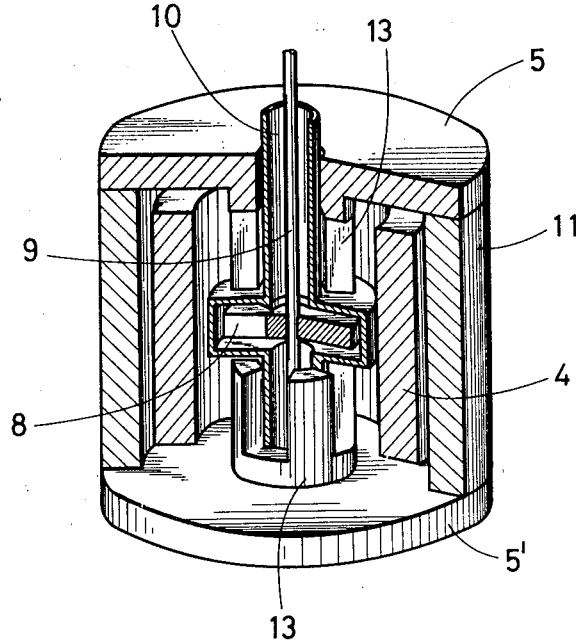

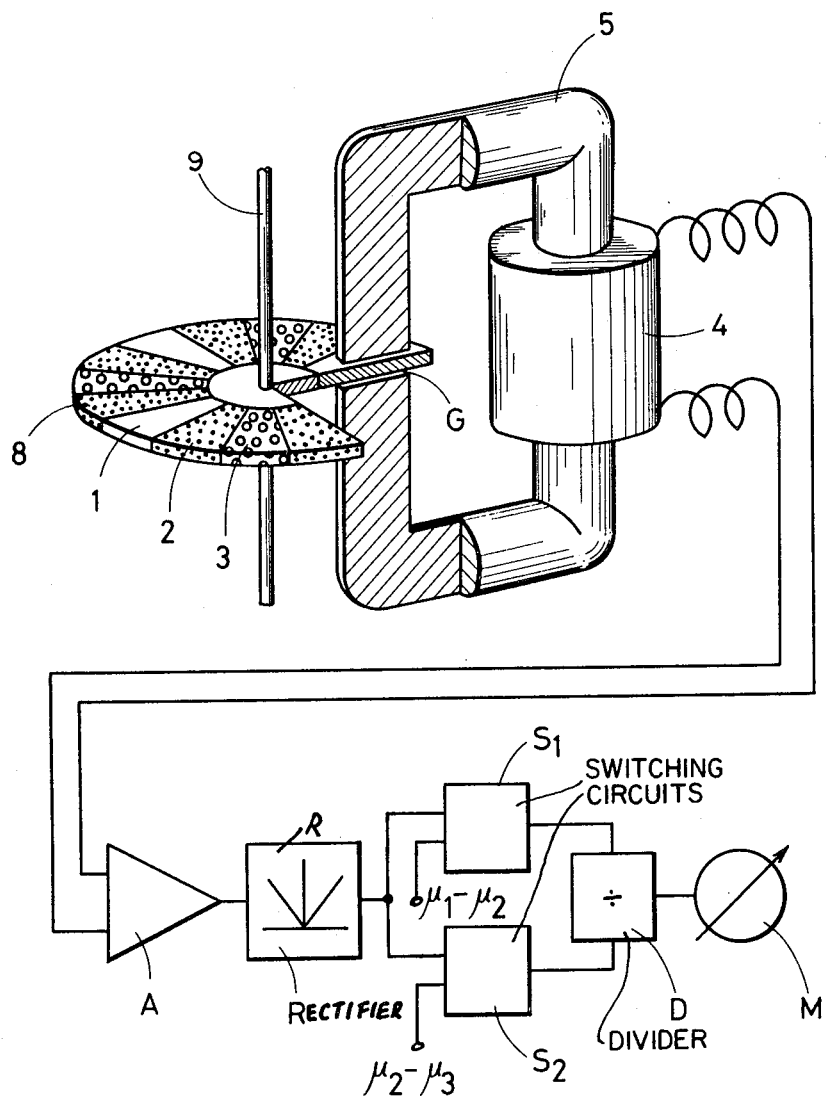

APPARATUS FOR DETERMINING THE PERMEABILITY OF A NON-MAGNETIC MEDIUM

BACKGROUND OF THE INVENTION

This invention relates to a permeameter, and more specifically to an instrument for measuring the magnetic permeability of gases, oils, etc., which are non-ferromagnetic and also poor electrical conductors.

A typical example of a permeameter is an oxygen meter. As is well known, oxygen is one of the substances among non-ferromagnetic substances which have a relatively high permeability. Therefore, by making skillfull use of this fact the permeability may be measured quantitively. Thus, the most conventional oxygen meters are types which measure the amount of oxygen by measuring the permeability of the substance to be measured. A typical conventional permeameter is arranged so that a sample to be measured is placed in an uneven magnetic field and a mechanical force is measured which the uneven field applies to the sample as a function of the permeability of the sample. Since the force is proportional to the permeability of the sample, the permeability of the sample can be determined by measuring the force. Except for ferromagnetic substances, however, most common substances have a permeability approximating to that of vacuum. Therefore, if samples of substances with such permeability are placed in the uneven field, the resultant forces are extremely small so that the measuring is difficult and errors are liable to occur.

Furthermore, in general, an unknown permeability is determined by measuring the standard permeability sample and a sample whose permeability is to be measured, in turn, and then comparing the results. This is rather time consuming. For this reason, it is difficult to measure instantaneously and momentarily the permeability of samples which vary rapidly like those of fluids, by an instrument based on the above principles.

Another typical conventional permeameter is so operated that a sample substance with a certain permeability is electromagnetically coupled with a magnetic flux generated by a magnetic coil energized by an alternating power source. The inductance variation of the coil caused by placing the sample in the coil is then measured. It is well known that this variation of the inductance is proportional to the permeability of the sample. If, however, this system is used, variations of the frequency and of the voltage of the alternating power source applied to the coil and also any change in the coil size caused by a temperature change may give rise to errors in the measured values.

Further, if this principle is employed, it is not easy to detect the permeability of a substance having a relatively small permeability which merely causes a small change of inductance. Further, it is difficult to maintain a sufficient precision over long time periods.

OBJECTS OF THE INVENTION

In view of the foregoing it is the aim of the invention to achieve the following objects singly or in combination:
to overcome drawbacks of the prior art;
to measure with a short response time the permeability of a substance which is non-ferromagnetic and electrically a poor conductor;
to measure the permeability of a substance which is non-ferromagnetic and a poor electrical conductor in an accurate and stable manner;
to provide a permeameter suited for measuring the permeability of gas; and
to provide an oxygen meter having a short response time.

SUMMARY OF THE INVENTION

Briefly stated, this invention comprises a magnetic circuit which is biased by direct current magnetic flux and which has a gap, an electromagnetic detecting coil and a plurality of bodies of different permeability which are positioned in the gap and displaced alternately in the gap. The alternate displacement of a plurality of bodies changes the flux in the gap and thereby the coil provides an alternate output. This alternate output is proportional to the difference between the permeabilities of these bodies, as will be described in more detail below. If one body is a standard sample of known permeability and the other body is a sample of unknown permeability to be measured, the permeability of the sample to be measured may be determined instantaneously by suitably processing the alternating output.

In a preferred embodiment, a plurality of samples, including a single sample of unknown permeability to be measured and more than two standard samples are used, so that errors resulting from the variation of the direct current magnetic bias and from the variation in the speed of displacing the samples may be avoided by sampling and the detecting outputs of more than two samples and by determining the ratio of outputs.

In another preferred embodiment, one of the plurality of samples is replaced by a space to be occupied by a gas and such measuring instrument is put in the gas atmosphere the permeability of which is to be measured. Such embodiment may be employed very advantageously particularly for measuring the permeability of oxygen. In other words, the use of this embodiment provides a preferred oxygen meter.

BRIEF DESCRIPTION OF THE DRAWINGS

In order that the invention may be clearly understood, it will now be described, by way of example, with reference to the accompanying drawings, wherein

FIG. 2 is a perspective view, partially in section, of another embodiment of this invention;

FIG. 3 is a perspective view, partially in section, of a further embodiment of this invention;

FIG. 4 is a perspective view, partially in section, of still a further embodiment of this invention.

DESCRIPTION OF PREFERRED EMBODIMENTS

Figure 1:
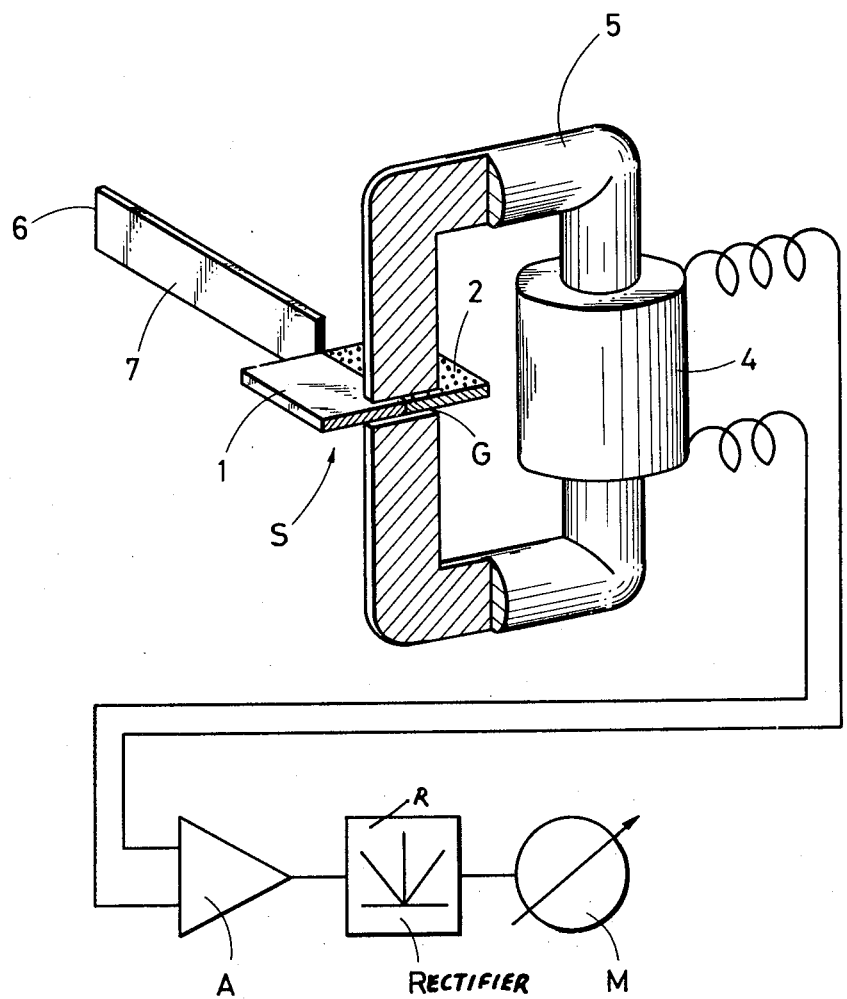
FIG. 1 shows a perspective view, partially in section, of an embodiment of this invention including an electric circuit and indicating means.

Referring to FIG. 1, a magnetic circuit magnetically biased in direct current manner by a magnet 5 of ferromagnetic material comprises a gap G. A detecting coil 4 is wound around the part of the magnet 5 for example, opposite the gap G. In a gap there is positioned a vibrating sample S comprising two segments 1 and 2 which are non-ferromagnetic substances and poor electrical conductors. The vibrating sample S is set in reciprocating motion by the action of a spring member 7 held in a fixed position at its end 6 remote from the gap so that the segments 1 and 2 are alternately positioned inside gap G. The permeability of a material of the segment 1 is unknown, while the segment 2 is a standard sample having a known permeability.

In operation, the vibrating sample S is moved or displaced reciprocally, by the action of the spring 7, in such a direction as to pass through the gap G and transverse the magnetic circuit, so that the segments 1 and 2 are alternately interposed in the gap G. Due to the alternate displacing of the segments 1 and 2 in gap G, the magnetic reluctance of the magnetic circuit formed by the magnet 5 changes accordingly, so that the magnetic flux within the magnet 5 changes. Hence, the electric alternating output voltage at coil 4 changes in accordance with the change of this magnetic flux. It is to be noted that this alternating output is proportional to the difference between the permeabilities of the segments 1 and 2. The present invention utilizes this fact to measure the permeability of a substance.

The relationship between this output voltage and the permeability of a sample will now be described in more detail. As is well known, the relation between a magnetomotive force $Fo$, the total magnetic flux in the magnet 5, the magnetic reluctance $R_1$ in the magnet 5, and the magnetic reluctance $R_2$ in the gap G is expressed by the following equation:

$$Fo = I(R_1 + R_2) \quad (1)$$

Since a ferromagnetic substance is used as the magnet 5, $R_1$ and $R_2$ may be deemed to satisfy $R_1 << R_2$. If the thickness of the sample S is $a$, the area of the gap G is $S'$, the permeability of segment 1 is $\mu_1$, and that of segment 2 is $\mu_2$ and if the area which the segments 1 and 2 occupy, changes in a sine wave manner, the change of the magnetic reluctance $R_2$ is expressed as follows:

$$R_2(t) = a/\mu_1 S'(1-\sin 2\pi ft) + \mu_2 S' \sin 2\pi ft \quad (2)$$

Accordingly, the change of the magnetic flux in the magnet 5 is expressed as follows:

$$\Phi(t) = Fo/R_2(t) = (Fo\,S'/a)[\mu_1 + (\mu_2 - \mu_1)\sin 2\pi ft] \quad (3)$$

The voltage $e(t)$ generated in the detecting coil 4 which has a number of N turns is expressed by the following equation:

$$e(t) = -N[dI(t)/dt] = 2\pi f N Fo S'(\mu_1 - \mu_2)\cos 2\pi ft/a \quad (4)$$

As may be seen from equation (4), the output voltage of the detecting coil 4 is related to the permeability $\mu_1$ in the segment 1. Therefore, by employing a substance of known permeability for the segment 2, by suitably processing the alternating output from the coil 4, such as amplifying the output of the coil 4 with an amplifier A, rectifying the output of the amplifier A in a full-wave rectifier R and indicating the resulting signal in a properly calibrated meter M, the permeability of the substance of the segment 1 may be directly read from the meter M.

If in FIG. 1 the segment 1 is a fluid, for example a gas, the fluid may be put in a suitable container. However, if the part corresponding to the segment 1 is vacant space, the whole instrument illustrated in FIG. 1 may be placed in the atmosphere of the gas to be measured and the same result will be obtained. This has the advantage that this invention makes it extremely easy to instantaneously measure the permeability of any gas.

Referring to FIG. 2, a perspective view, partially in section, of another embodiment of this invention is shown. The indicating electric circuit to be connected to the detecting coil 4, may be the same as that of FIG. 1. In the embodiment shown in FIG. 2, a sample 8 in a disc form is prepared instead of the sample S in a chip form, the disc is rotated by the rotating shaft 9 and the segments 1 and 2 are so positioned alternately along the circumference of the disc 8 that the segments 1 and 2 may alternately enter and leave the gap G. The remaining structure is the same as that shown in FIG. 1.

FIG. 3 shows a perspective view, partially in section, of a further embodiment of this invention including a signal processing circuit for the output signal from the detecting coil 4. The embodiment of FIG. 3 is basically similar to that in FIG. 2 and three kinds of segments 1, 2, and 3 are arranged in the order of 1-2-3-2-1-2-3-2-1 In this embodiment the permeability of the substances of segments 2 and 3 are known. Referring to the equation (4), the coil 4 provides, at a certain timing, an output signal proportional to the difference in permeability, i.e., $\mu_1 - \mu_2$ between the segments 1 and 2. At a certain other timing, an output signal proportional to the difference in permeability, i.e., $\mu_2 - \mu_3$, between the segments 2 and 3 is obtained. In the circuit of the embodiment shown in FIG. 3, switching circuits $S_1$ and $S_2$ and also a divider D, for evaluating the ratio of the output signals are provided between a rectifying circuit R and a meter M. For example, the switching circuit $S_1$ is actuated by the clock signal C $\mu_1 - \mu_2$ at the timing when the difference in permeability of the segments 1 and 2, i.e., $\mu_1 - \mu_2$ is obtained, while the switching circuit $S_2$ is actuated by the clock signal C $\mu_2 - \mu_3$ at the timing when the difference between the permeabilities of the segments 2 and 3, i.e., $\mu_2 - \mu_3$ is obtained. The indication $I(t)$ on the meter M is expressed as follows:

$$I(t) = (e1 - 2)/(e2 - 3) = \mu_1 - \mu_2/\mu_2 - \mu_3 \quad (5)$$

As seen from the equation (5), the indication $I$ is independent of the frequency $f$ and the magnetomotive force $Fo$. In other words, according to the embodiment shown in FIG. 3, it is not necessary to know the magnetomotive force $Fo$ and the frequency $f$ for the purpose of determining the permeability. As seen from the equation (4), the output of coil 4 relates to the magnetomotive force $Fo$ and these values will lead to errors in measuring the permeability. For this reason, in the embodiment shown in FIGS. 1 and 2, it is necessary to see to it that the magnetomotive force $Fo$ and frequency $f$ are stabilized. On the other hand, the embodiment of FIG. 3 is free from such errors and provides accurate measuring.

FIG. 4 is a perspective view, partially in section of still a further embodiment of this invention which is suited for measuring the permeability of fluids such as a gas. The magnetic circuit comprises a cylindrical permanent magnet 11 and discoid magnetic poles 5 and 5', each having four magnetic pole pieces 13. The magnetic pole pieces 13 of the discoid magnetic poles 5 and 5' are placed face to face, respectively, forming four gaps. The cylindrical coil 4 is housed inside the cylindrical permanent magnet 11. A toothed-wheel-like disc 8 having four teeth is rotated by a shaft 9 so that the disc may rotate within the four gaps. As shown in FIG. 4, a cylindrical part 10 is formed in such a way that the shaft 9 and the disc 8 are housed in the part 10 which is surrounded by the four magnetic pole pieces 13 of the discs 5 and 5' and positioned within the four gaps. The toothed-wheel-like disc 8 is composed of a material with the known permeability and a fluid with unknown permeability is allowed to flow from one end to the other end of the rotating shaft 9 in the cylindrical part 10. If the disc 8 is rotated, the difference in permeability between a sample to be measured and the standard sample composing the teeth of the disc 8 is measured. If the tooth part of disc 8 provides two kinds standard samples, as shown in FIG. 3, measuring errors resulting from frequency variations of disc 8 and errors resulting from variations in the direct current magnetic flux between the magnetic poles 5 and 5' may be avoided.

Figure 5:
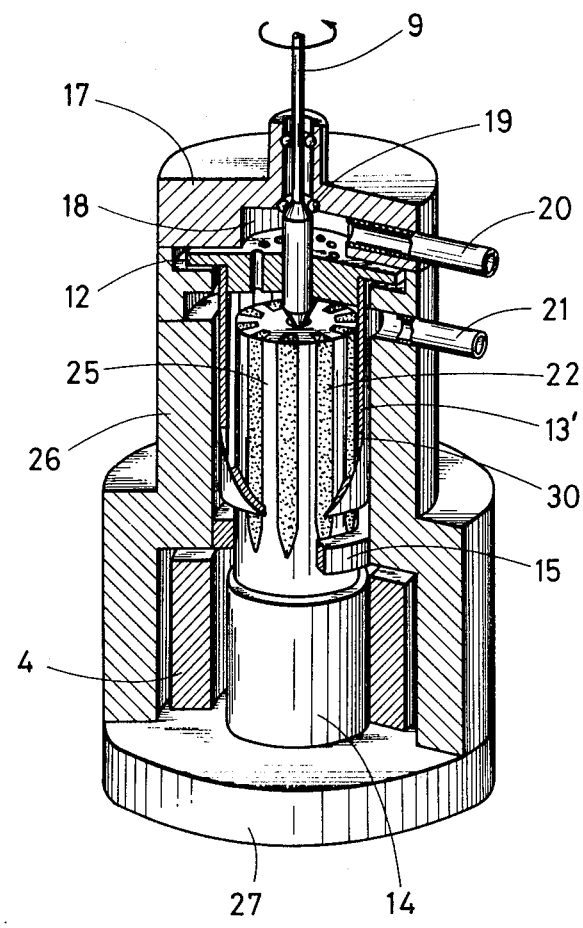
FIG. 5 is a perspective view, partially in section, of yet another embodiment of this invention.

Referring to FIG. 5 a more preferred embodiment of this invention is shown. The magnetic circuit of the embodiment of FIG. 5 comprises basically a columnar magnetic pole 25, a cylindrical magnetic pole 26 positioned to surround the pole 25 and a disc magnetic pole 27 for coupling both poles 25 and 26. A gap is formed between the outer wall of the columnar magnetic pole 25 and the inner wall of the cylindrical magnetic pole 26. In order to provide a direct-current type magnetic bias for this magnetic circuit, a permanent magnet 14 is arranged between the columnar magnetic pole 25 and the discoid pole 27. A casing 17 is coupled to the upper part of cylindrical magnetic pole 26 forming a space or a gas chamber 18 in the upper part of the columnar magnetic pole 25. The rotating shaft 9 extends upwardly from the upper part of the columnar magnetic pole 25 through the casing 17 and the rotating shaft 9 is universally supported by the upper part of columnar magnetic pole 25 and by a bearing 19. The rotating shaft 9 is also supported by an 0-ring for maintaining airtightness between the space 18 and the open air. In the middle of the space 18 a rotating partition plate 12 is fitted to the rotating shaft 9 thereby the space 18 is partitioned into upper and lower chambers. The rotating partition plate 12 is provided with a plurality of holes and thus the upper and lower chambers communicate with each other. For communication with the upper chamber a upper chamber gas supply pipe 20 is provided. Likewise, a gas discharge pipe 21 is connected to the lower chamber. A cylindrical magnetic flux-permeating medium 13' is provided, extending from the rotating partition plate 12 downwardly through the gap. Slightly below the lower end of the cylindrical magnetic flux permeating medium 13' an airtight sealing member 15 is provided between the magnetic poles 25 and 26. Along the outer circumference of the columnar magnetic pole 25 slots are provided extending axially, thus forming a plurality of gap portions extending axially between the outer circumference of the columnar magnetic pole 25 and the inner circumference of the cylindrical magnetic pole 26. If necessary, it is advisable to fill the slots with a filler 22 of non-ferromagnetic material to make the surface of the columnar magnetic pole 25 flat. The cylindrical magnetic flux permeating medium 13', likewise, comprises a plurality of segments, each being made of a substance with the standard permeability, corresponding to a plurality of gap portions, extending axially, thus assuming a cage form. A diaphragm 30 is applied over the outer circumference of the cylindrical and basket-like magnetic flux permeating medium 13' and thereby the gap is partitioned into inner and outer gap portions.

In operation a gas the permeability which is to be measured, is fed from the gas supply pipe 20 into the gas chamber 18. The gas thus fed flows from the gas chamber 18 through the holes of the rotating plate 12, goes inside the gap, returns at the sealing member 15, goes through the outer gap and is discharged out of the discharge pipe 21. The rotating shaft 9 is rotated as in the other embodiments and thereby the coil 4 provides an output voltage which corresponds or relates to the permeability of the gas.

According to the embodiment of FIG. 5, the gap area and accordingly the output voltage may be increased with ease to the desired degree merely by extending the magnetic poles 25 and 26 axially. In accordance with the embodiments of FIGS. 2 to 4, an increase in the gap area limits the rotational speed of the rotating body. On the other hand, according to the embodiment in FIG. 5, it is seen that the gap area can be increased, as desired, merely by increasing the axial length of the rotating body and the magnetic circuit member portion related to the body without increasing the diameter of the rotating body.

If the concentration of oxygen in a mixed gas is to be measured by using the device as shown in the embodiments in FIGS. 4 and 5 and if the number of revolutions of the disc 8 is 60 per second and the teeth of the disc 8 are 10 in number, a signal of 600 Hz is obtained at the ends of the coil 4 and the minimum response time is then 1/600 sec. This means that the present invention provides a response time at least a number of two digits, e.g., 10 times shorter than that of the conventional magnetic oxygen meters, say, a few seconds. Further, if in addition to the rotating disc 8 the system in the embodiment if FIG. 3 is used, it is possible to make precise measurements over a long time period and to dispense with procedures of adjusting a precise balance and calibrating which are required in the conventional alternating bridge system.

In this invention, if the magnet and sample increase their relative motion speed, the measuring sensitivity becomes higher and the response time becomes shorter in proportion to the speed. Further, in each of the embodiments shown and described hereinabove, if the frequency at which a sample to be measured enters and leaves the clearance or gap of a magnet, is adjusted to make the signal voltage of the coil 4 constant, it is possible to determine the permeability of the sample to be measured as a function of the frequency.

This invention makes it possible to measure changes of the permeability of substances which are non-ferromagnetic and poor electrical conductors, in a quick and stable manner. This invention also makes it possible to use not only a permanent magnet but also an electromagnet which contains an alternating signal lower than the frequency of the relative motion of a sample to be measured through the clearance of the magnet.

Further, the above measuring can also be obtained if the volume of a sample to be measured which occupies the clearance of a magnet is made constant and the form is changed according to the time.

While specific preferred embodiments of the invention have been described, it is to be understood that it is intended to cover all modifications and equivalents of the invention as defined by the appended claims.

What is claimed is:

1. An apparatus for determining the permeability of a non-magnetic medium, comprising:
    a magnetic circuit having a constant magnetic bias, said magnetic circuit having a gap,
    detecting coil means electrically coupled to said magnetic circuit,
    a magnetic flux permeable medium positioned in said gap, said medium having a first region of a first material of unknown permeability, and second and third regions of second and third materials respectively of known different permeabilities,
    means for displacing said medium in said gap for changing the magnetic flux in said magnetic circuit as a function of the displacement of said regions, whereby a first output signal is produced in said coil means in response to a change of displacement of said first and second regions with respect to said magnetic circuit, and a second output signal is produced in said coil means in response to a change of displacement of said second and third regions with respect to said magnetic circuit, and
    output circuit means connected to said coil means and responsive to said first and second signals for determining the permeability of said material of said first region.

2. The apparatus of claim 1, wherein said means for displacing said medium comprises means for rotating said medium.

3. The apparatus of claim 1, wherein the material of said first region is a fluid.

4. The apparatus of claim 3, wherein said fluid is a gas.

5. The apparatus of claim 4, wherein said gas is oxygen.

6. The apparatus of claim 3, wherein said first region comprises a space which includes said gap, said space being filled with said fluid.

7. The apparatus of claim 2, wherein said magnetic circuit comprises a plurality of magnetic pole pairs arranged to form said gap, whereby a plurality of gap portions are formed, said medium comprising a corresponding plurality of groups of regions.

8. The apparatus of claim 7, wherein said first material is a fluid and said gap is circular, said apparatus further comprising housing means defining a space surrounding said gap, said means for rotating said medium comprising rotating shaft means extending normally through the center of said circular gap, wherein said pole pairs are arranged about the periphery of said circular gap, and further comprising tube means for introducing said fluid to said housing, said tube means being positioned coaxially with respect to said rotating shaft means.

9. The apparatus of claim 8, wherein said magnetic circuit comprises a cylindrical permanent magnet having a central longitudinally extending aperture and a disc shaped pole piece at each end of said cylindrical magnet, said pole pairs extending centrally in said aperture between said pole pieces, said housing and coil means being positioned within said cylindrical magnet.

10. The apparatus of claim 7, wherein said magnetic circuit comprises a columnar magnetic pole piece and a cylindrical magnetic pole piece positioned concentrically about the columnar magnetic pole piece, whereby said gap is formed therebetween, said pole pairs comprising a plurality of magnetic pole pieces positioned to extend axially along the outer circumference of the columnar magnetic pole piece and the inner circumference of the cylindrical magnetic pole piece, whereby said gap portions are formed therebetween, said medium having a corresponding plurality of groups of regions also extending circumferentially.

11. The apparatus of claim 1, wherein said magnetic circuit comprises a columnar magnetic pole piece having an outer circumferential wall, and a cylindrical magnetic pole piece having an inner circumferential wall, said first material being a fluid, said medium having a cylindrical shape with said second and third regions forming a partition for the fluid to divide the gap into an inner space defined by the partition and the outer circumferential wall of the columnar magnetic pole piece, and an outer space defined by the partition and the inner circumferential wall of the cylindrical magnetic pole piece, and further comprising means for introducing said fluid into the inner space at one axial end thereof, means for discharging fluid from the corresponding end of the outer space, and fluid flow path means between the other ends of the inner and outer spaces.

12. A method for measuring the permeability of non-ferromagnetic materials having poor electrical conductivity, said method comprising:
    positioning a magnetic flux permeable medium in a gap formed in a magnetic circuit electromagnetically coupled to a detection coil, said magnetic flux permeable medium comprising a first region of unknown permeability and second and third regions of materials of known different permeabilities,
    displacing the medium within said gap with respect to the magnetic circuit for effecting a change of said flux, thereby providing a first output signal in said coil responsive to the change of said flux caused by the displacement of the materials of the first and second regions with respect to said magnetic circuit, and a second output signal in the coil responsive to the change of said flux caused by displacement of the materials of said second and third regions with respect to said magnetic circuit, and
    processing said first and second output signals to determine the permeability of the material of said first region.

* * * * *